US012532912B2

(12) United States Patent
Thorsen

(10) Patent No.: US 12,532,912 B2
(45) Date of Patent: *Jan. 27, 2026

(54) APPARATUS FOR HEATING SMOKABLE MATERIAL

(71) Applicant: NICOVENTURES TRADING LIMITED, London (GB)

(72) Inventor: Mitchel Thorsen, Madison, WI (US)

(73) Assignee: NICOVENTURES TRADING LIMITED, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/592,024

(22) Filed: Feb. 29, 2024

(65) Prior Publication Data

US 2024/0315324 A1 Sep. 26, 2024

Related U.S. Application Data

(63) Continuation of application No. 16/099,323, filed as application No. PCT/EP2017/061519 on May 12, 2017, now Pat. No. 11,937,629.

(51) Int. Cl.
*A24F 1/02* (2006.01)
*A24F 40/00* (2020.01)
(Continued)

(52) U.S. Cl.
CPC ................ *A24F 1/02* (2013.01); *A24F 40/00* (2020.01); *A24F 40/10* (2020.01); *A24F 40/46* (2020.01);
(Continued)

(58) Field of Classification Search
CPC ............. A24F 40/00; A24F 40/10; A24F 1/02
See application file for complete search history.

(56) References Cited

U.S. PATENT DOCUMENTS 174,884 A 3/1876 Wolff
239,198 A 3/1881 Simonds
(Continued)

FOREIGN PATENT DOCUMENTS

AR 88426 A1 6/2014
AU 2016282378 A1 1/2018
(Continued)

OTHER PUBLICATIONS

PEEK international (Year: 2024).*
(Continued)

*Primary Examiner* — Michael H. Wilson
*Assistant Examiner* — Jennifer A Kessie
(74) *Attorney, Agent, or Firm* — Merchant & Gould P.C.

(57) ABSTRACT

An apparatus arranged to heat smokable material to volatilize at least one component of the smokable material. The apparatus includes a housing, the housing having a first opening at a first end through which a consumable article containing smokable material can be removably inserted into the apparatus; at least one heater arrangement arranged within the housing for heating smokable material within the consumable article when in use and a hollow chamber between the first opening and the at least one heater arrangement. The hollow chamber surrounds at least a portion of the consumable article when the consumable article is inserted into the device and an inner wall of the chamber and the at least a portion of the consumable article define an air gap there between. Hot vapors that escape the consumable article in use can condense on the inner wall of the hollow chamber.

10 Claims, 8 Drawing Sheets

(51) Int. Cl.

| | |
|---|---|
| ***A24F 40/10*** | (2020.01) |
| ***A24F 40/20*** | (2020.01) |
| ***A24F 40/46*** | (2020.01) |
| ***A24F 40/485*** | (2020.01) |
| ***H05B 3/06*** | (2006.01) |
| ***H05B 3/14*** | (2006.01) |
| ***H05B 3/46*** | (2006.01) |

(52) U.S. Cl.

CPC ............. *A24F 40/485* (2020.01); *H05B 3/06* (2013.01); *H05B 3/146* (2013.01); *H05B 3/46* (2013.01); *A24F 40/20* (2020.01)

(56) References Cited

U.S. PATENT DOCUMENTS

| | | | |
|---|---|---|---|
| 239,776 A | | 4/1881 | Henley |
| D22,270 S | | 3/1893 | Kinney |
| D27,458 S | | 8/1897 | Cameron, Jr. |
| 1,927,956 A | | 9/1933 | Samuel |
| 2,371,557 A | | 3/1945 | Sullivan |
| D164,391 S | | 8/1951 | Wagner |
| 3,236,243 A | | 2/1966 | Seymour |
| 3,519,000 A | | 7/1970 | Houser |
| D239,631 S | | 4/1976 | Gilles |
| D239,776 S | | 5/1976 | Kenjiro |
| 4,214,658 A | | 7/1980 | Crow |
| 4,226,250 A | | 10/1980 | Ehrenpreis et al. |
| D284,506 S | | 7/1986 | Gutknecht |
| D301,837 S | | 6/1989 | Peterson et al. |
| D303,766 S | | 10/1989 | Delbanco |
| 5,144,962 A | | 9/1992 | Counts et al. |
| D360,281 S | | 7/1995 | Kim |
| 5,564,442 A | | 10/1996 | Macdonald et al. |
| 5,649,554 A | | 7/1997 | Sprinkel et al. |
| 5,665,262 A | | 9/1997 | Hajaligol et al. |
| 5,692,291 A | * | 12/1997 | Deevi ...................... A24D 1/20 338/319 |
| 5,708,258 A | | 1/1998 | Counts et al. |
| 5,878,752 A | | 3/1999 | Adams et al. |
| 5,954,979 A | | 9/1999 | Counts et al. |
| D422,113 S | | 3/2000 | Higgins et al. |
| D424,236 S | | 5/2000 | Reed |
| 6,158,530 A | | 12/2000 | Bowen et al. |
| D437,112 S | | 2/2001 | Toffoli |
| D446,849 S | | 8/2001 | Weinberg |
| 6,418,938 B1 | | 7/2002 | Fleischhauer et al. |
| D506,001 S | | 6/2005 | Christianson |
| D512,493 S | | 12/2005 | Haranaka |
| D538,222 S | | 3/2007 | Curello et al. |
| D558,060 S | | 12/2007 | Hacek |
| D558,330 S | | 12/2007 | Chang |
| D576,718 S | | 9/2008 | Nomi et al. |
| D634,417 S | | 3/2011 | Abbondanzio et al. |
| D634,832 S | | 3/2011 | Abbondanzio et al. |
| D643,732 S | | 8/2011 | Cummings et al. |
| 7,988,660 B2 | | 8/2011 | Byland et al. |
| D645,757 S | | 9/2011 | Milhem et al. |
| D648,340 S | | 11/2011 | Okura |
| D650,472 S | | 12/2011 | Petersen |
| D654,160 S | | 2/2012 | Yomtov |
| D657,857 S | | 4/2012 | Choi |
| D663,891 S | | 7/2012 | Cohen |
| D664,709 S | | 7/2012 | Almsberger et al. |
| D665,734 S | | 8/2012 | Fitch et al. |
| D674,479 S | | 1/2013 | Merchant et al. |
| D677,623 S | | 3/2013 | Fitch et al. |
| D677,774 S | | 3/2013 | Postma |
| 8,528,780 B2 | | 9/2013 | Houghton et al. |
| D695,396 S | | 12/2013 | Tani et al. |
| D696,815 S | | 12/2013 | Abroff |
| D700,397 S | | 2/2014 | Manca et al. |
| D704,319 S | | 5/2014 | Cai |
| D708,129 S | | 7/2014 | Houghton et al. |
| D708,727 S | | 7/2014 | Postma |
| D714,647 S | | 10/2014 | Kersten |
| D715,760 S | | 10/2014 | Kim et al. |
| D716,267 S | | 10/2014 | Kim et al. |
| 8,915,254 B2 | | 12/2014 | Monsees et al. |
| D728,855 S | | 5/2015 | Liu |
| D729,440 S | | 5/2015 | Liu |
| D729,445 S | | 5/2015 | Leidel |
| D732,023 S | | 6/2015 | Asao |
| D736,455 S | | 8/2015 | Liu |
| D740,673 S | | 10/2015 | Corradini et al. |
| D743,099 S | | 11/2015 | Oglesby |
| D743,889 S | | 11/2015 | Lyles et al. |
| D745,404 S | | 12/2015 | Julier et al. |
| D746,771 S | | 1/2016 | Perez |
| D758,656 S | | 6/2016 | Freshwater et al. |
| D759,296 S | | 6/2016 | Abroff et al. |
| D760,414 S | | 6/2016 | Brown et al. |
| D768,834 S | | 10/2016 | Schuller et al. |
| D771,867 S | | 11/2016 | Leidel et al. |
| D773,114 S | | 11/2016 | Leidel et al. |
| 9,499,332 B2 | | 11/2016 | Fernando et al. |
| D775,762 S | | 1/2017 | Chen |
| D778,831 S | | 2/2017 | Chen |
| D787,657 S | | 5/2017 | Farone et al. |
| D787,728 S | | 5/2017 | Wing et al. |
| D788,364 S | | 5/2017 | Chen |
| D807,575 S | | 1/2018 | Luo |
| D818,637 S | | 5/2018 | Ringel |
| D819,023 S | | 5/2018 | Shim |
| D821,640 S | | 6/2018 | Qiu |
| D828,295 S | | 9/2018 | Li |
| D828,622 S | | 9/2018 | Chen et al. |
| D828,912 S | | 9/2018 | Powell et al. |
| D828,950 S | | 9/2018 | Gu |
| D828,953 S | | 9/2018 | Chen |
| D833,384 S | | 11/2018 | Takayanagi |
| 10,136,679 B1 | | 11/2018 | Shotey et al. |
| D835,857 S | | 12/2018 | Benacquisto et al. |
| D839,823 S | | 2/2019 | Lemelson et al. |
| 10,194,697 B2 | | 2/2019 | Fernando et al. |
| D842,237 S | | 3/2019 | Qiu et al. |
| D842,243 S | | 3/2019 | Qiu |
| D843,052 S | | 3/2019 | Powell et al. |
| D844,030 S | | 3/2019 | You |
| D848,603 S | | 5/2019 | Fujino et al. |
| D853,022 S | | 7/2019 | Srour |
| D854,236 S | | 7/2019 | Qiu |
| D861,549 S | | 10/2019 | Lai |
| D869,086 S | | 12/2019 | Pan |
| D870,367 S | | 12/2019 | Chung et al. |
| D872,355 S | | 1/2020 | Powell et al. |
| D876,214 S | | 2/2020 | Yu |
| D881,458 S | | 4/2020 | Ouyang |
| D883,197 S | | 5/2020 | Doucet |
| D883,563 S | | 5/2020 | Pan |
| D884,266 S | | 5/2020 | Wang |
| D884,961 S | | 5/2020 | He |
| D885,332 S | | 5/2020 | Han |
| D885,337 S | | 5/2020 | Xu |
| D885,651 S | | 5/2020 | Miyamoto |
| D888,326 S | | 6/2020 | Qiu |
| D888,329 S | | 6/2020 | Qiu |
| D889,740 S | | 7/2020 | Beer et al. |
| D891,692 S | | 7/2020 | Barbaric et al. |
| D892,124 S | | 8/2020 | Shim |
| D893,009 S | | 8/2020 | Choi |
| D894,476 S | | 8/2020 | Miyamoto |
| D896,519 S | | 9/2020 | Cooper et al. |
| D897,596 S | | 9/2020 | Huang et al. |
| D898,280 S | | 10/2020 | Li et al. |
| D898,990 S | | 10/2020 | Liu et al. |
| D898,991 S | | 10/2020 | Pan |
| 10,791,765 B2 | | 10/2020 | Li et al. |
| D901,072 S | | 11/2020 | Goradesky |
| D904,401 S | | 12/2020 | Wu |
| D904,678 S | | 12/2020 | Wang et al. |
| D905,901 S | | 12/2020 | Kim et al. |
| D908,344 S | | 1/2021 | Jones |
| D908,834 S | | 1/2021 | Cho et al. |

(56) References Cited

U.S. PATENT DOCUMENTS

| | | | | |
|---|---|---|---|---|
| D908,952 | S | 1/2021 | Guo | |
| 11,134,717 | B2 | 10/2021 | Naughton et al. | |
| 11,700,883 | B2 | 7/2023 | Naughton et al. | |
| 2003/0150451 | A1 | 8/2003 | Shayan | |
| 2004/0025865 | A1 | 2/2004 | Nichols et al. | |
| 2005/0199610 | A1 | 9/2005 | Ptasienski et al. | |
| 2007/0074734 | A1 | 4/2007 | Braunshteyn et al. | |
| 2007/0283972 | A1 | 12/2007 | Monsees et al. | |
| 2008/0149118 | A1 | 6/2008 | Oglesby et al. | |
| 2009/0014640 | A1 | 1/2009 | Schaumloffel et al. | |
| 2009/0114737 | A1 | 5/2009 | Yu et al. | |
| 2009/0145448 | A1 | 6/2009 | Worlock et al. | |
| 2009/0320864 | A1 | 12/2009 | Rowley | |
| 2010/0218778 | A1* | 9/2010 | Borden | A24F 1/02 131/194 |
| 2010/0236561 | A1 | 9/2010 | Barnes et al. | |
| 2010/0275779 | A1 | 11/2010 | Melikyan | |
| 2011/0108025 | A1 | 5/2011 | Fink et al. | |
| 2011/0240047 | A1 | 10/2011 | Adamic | |
| 2011/0290244 | A1 | 12/2011 | Schennum | |
| 2013/0042865 | A1 | 2/2013 | Monsees et al. | |
| 2014/0060554 | A1 | 3/2014 | Collett et al. | |
| 2014/0069444 | A1 | 3/2014 | Cyphert et al. | |
| 2014/0196718 | A1 | 7/2014 | Li et al. | |
| 2014/0338680 | A1 | 11/2014 | Abramov et al. | |
| 2014/0366898 | A1 | 12/2014 | Monsees et al. | |
| 2015/0053217 | A1 | 2/2015 | Steingraber et al. | |
| 2015/0059787 | A1 | 3/2015 | Qiu | |
| 2015/0101606 | A1 | 4/2015 | White | |
| 2015/0101944 | A1 | 4/2015 | Li et al. | |
| 2015/0144145 | A1 | 5/2015 | Chang et al. | |
| 2015/0181934 | A1 | 7/2015 | Lyubomirskiy et al. | |
| 2015/0181937 | A1 | 7/2015 | Dubief et al. | |
| 2015/0189919 | A1 | 7/2015 | Liu | |
| 2015/0245658 | A1 | 9/2015 | Worm et al. | |
| 2015/0257447 | A1 | 9/2015 | Sullivan | |
| 2016/0007652 | A1 | 1/2016 | Taluskie et al. | |
| 2016/0081395 | A1 | 3/2016 | Thorens et al. | |
| 2016/0150828 | A1 | 6/2016 | Goldstein et al. | |
| 2016/0255879 | A1* | 9/2016 | Paprocki | A24F 40/46 |
| 2017/0231276 | A1 | 8/2017 | Mironov et al. | |
| 2017/0232211 | A1 | 8/2017 | Gallem et al. | |
| 2018/0168224 | A1 | 6/2018 | Naughton et al. | |
| 2018/0271151 | A1 | 9/2018 | Litten | |
| 2019/0029326 | A1 | 1/2019 | Qiu | |
| 2019/0046745 | A1 | 2/2019 | Nettenstrom et al. | |
| 2019/0150508 | A1 | 5/2019 | Thorsen et al. | |
| 2019/0166918 | A1 | 6/2019 | Thorsen et al. | |
| 2019/0200678 | A1 | 7/2019 | Thorson et al. | |
| 2019/0208815 | A1 | 7/2019 | Thorsen | |
| 2019/0208816 | A1 | 7/2019 | Thorsen | |
| 2019/0208817 | A1 | 7/2019 | Qiu et al. | |
| 2019/0246693 | A1 | 8/2019 | Nettenstrom et al. | |
| 2019/0387799 | A1 | 12/2019 | Reevell | |
| 2020/0187555 | A1 | 6/2020 | Lee | |
| 2020/0245681 | A1 | 8/2020 | An | |
| 2020/0253280 | A1 | 8/2020 | Thorsen | |
| 2020/0345075 | A1 | 11/2020 | Hepworth | |
| 2020/0345960 | A1 | 11/2020 | Begin et al. | |
| 2020/0359706 | A1 | 11/2020 | Liu | |
| 2021/0000169 | A1 | 1/2021 | Hepworth | |
| 2021/0007401 | A1 | 1/2021 | Moloney et al. | |

FOREIGN PATENT DOCUMENTS

| | | | |
|---|---|---|---|
| AU | 2018246327 | B2 | 6/2021 |
| CN | 1122213 | A | 5/1996 |
| CN | 1126425 | A | 7/1996 |
| CN | 1190335 | A | 8/1998 |
| CN | 2393345 | Y | 8/2000 |
| CN | 1333657 | A | 1/2002 |
| CN | 1491598 | A | 4/2004 |
| CN | 1633247 | A | 6/2005 |
| CN | 1212785 | C | 8/2005 |
| CN | 1264440 | C | 7/2006 |
| CN | 1947462 | A | 4/2007 |
| CN | 101044795 | A | 9/2007 |
| CN | 101912654 | A | 12/2010 |
| CN | 202085709 | U | 12/2011 |
| CN | 102595943 | A | 7/2012 |
| CN | 102753047 | A | 10/2012 |
| CN | 202819632 | U | 3/2013 |
| CN | 203399710 | U | 1/2014 |
| CN | 103596458 | A | 2/2014 |
| CN | 103763953 | A | 4/2014 |
| CN | 103763954 | A | 4/2014 |
| CN | 103919279 | A | 7/2014 |
| CN | 103974639 | A | 8/2014 |
| CN | 104203015 | A | 12/2014 |
| CN | 104219973 | A | 12/2014 |
| CN | 204032371 | U | 12/2014 |
| CN | 104256898 | A | 1/2015 |
| CN | 204146325 | U | 2/2015 |
| CN | 104394721 | A | 3/2015 |
| CN | 104768407 | A | 7/2015 |
| CN | 104770894 | A | 7/2015 |
| CN | 105361249 | A | 3/2016 |
| CN | 205052881 | U | 3/2016 |
| CN | 205072064 | U | 3/2016 |
| CN | 205072072 | U | 3/2016 |
| CN | 304659647 | S | 6/2018 |
| CN | 304659654 | S | 6/2018 |
| CN | 304691359 | S | 6/2018 |
| CN | 304696494 | S | 6/2018 |
| CN | 304724787 | S | 7/2018 |
| CN | 304840668 | S | 10/2018 |
| CN | 304854337 | S | 10/2018 |
| CN | 304935891 | S | 12/2018 |
| CN | 109195463 | A | 1/2019 |
| CN | 305060127 | S | 3/2019 |
| CN | 305162683 | S | 5/2019 |
| CN | 305475358 | S | 12/2019 |
| CN | 107809919 | B | 7/2021 |
| DE | 19854005 | A1 | 5/2000 |
| DE | 19854009 | A1 | 5/2000 |
| DE | 102011119176 | A1 | 2/2013 |
| EM | 0026114260001 | | 3/2015 |
| EM | 0027270990001 | | 9/2017 |
| EM | 0027270990007 | | 9/2017 |
| EM | 0029810430001 | | 5/2018 |
| EP | 1917830 | A1 | 5/1999 |
| EP | 2316286 | A1 | 5/2011 |
| EP | 2340729 | A1 | 7/2011 |
| EP | 2797448 | A2 | 11/2014 |
| EP | 3954238 | A2 | 2/2022 |
| GB | 191000639 | A | 12/1910 |
| GB | 1400655 | A | 7/1975 |
| JP | S59161 | U | 1/1984 |
| JP | 1991108472 | A | 5/1991 |
| JP | H03108472 | A | 5/1991 |
| JP | H03232481 | A | 10/1991 |
| JP | H0590161 | U | 12/1993 |
| JP | H05090161 | U | 12/1993 |
| JP | 2000236865 | A | 9/2000 |
| JP | 2001521123 | A | 11/2001 |
| JP | 3392138 | B2 | 3/2003 |
| JP | 2003527127 | A | 9/2003 |
| JP | 2005510968 | A | 4/2005 |
| JP | 2006223158 | A | 8/2006 |
| JP | 2009509521 | A | 3/2009 |
| JP | 2013509160 | A | 3/2013 |
| JP | 5510968 | B2 | 6/2014 |
| JP | 2014520542 | A | 8/2014 |
| JP | 2014524313 | A | 9/2014 |
| JP | 2014525251 | A | 9/2014 |
| JP | 2014533513 | A | 12/2014 |
| JP | 2015519915 | A | 7/2015 |
| JP | 2015521847 | A | 8/2015 |
| JP | 2016534730 | A | 11/2016 |
| JP | 6539756 | B2 | 7/2019 |
| JP | 6737902 | B2 | 8/2020 |
| JP | 6764505 | B2 | 9/2020 |
| KR | 0178388 | B1 | 2/1999 |

(56) References Cited

FOREIGN PATENT DOCUMENTS

| | | | |
|---|---|---|---|
| KR | 20010089445 | A | 10/2001 |
| KR | 100304044 | B1 | 11/2001 |
| KR | 100404704 | B1 | 10/2004 |
| KR | 100495099 | B1 | 11/2005 |
| KR | 20070108215 | A | 11/2007 |
| KR | 20090011236 | U | 11/2009 |
| KR | 20100035492 | A | 4/2010 |
| KR | 20110115143 | A | 10/2011 |
| KR | 102233850 | B1 | 3/2021 |
| RU | 76781 | U1 | 10/2008 |
| RU | 2351131 | C2 | 4/2009 |
| RU | 2600092 | C2 | 10/2016 |
| WO | 8602528 | A1 | 5/1986 |
| WO | 9219081 | A1 | 10/1992 |
| WO | 9406314 | A1 | 3/1994 |
| WO | 9527412 | A1 | 10/1995 |
| WO | 9741744 | A1 | 11/1997 |
| WO | 9748295 | A1 | 12/1997 |
| WO | 9920939 | A1 | 4/1999 |
| WO | 0027232 | A1 | 5/2000 |
| WO | 0170054 | A1 | 9/2001 |
| WO | 03056948 | A1 | 7/2003 |
| WO | 2007039794 | A2 | 4/2007 |
| WO | 2010047389 | A1 | 4/2010 |
| WO | 2010095659 | A1 | 8/2010 |
| WO | 2011118024 | A1 | 9/2011 |
| WO | 2013025921 | A1 | 2/2013 |
| WO | 2013034460 | A1 | 3/2013 |
| WO | 2013055194 | A2 | 4/2013 |
| WO | 2013076098 | A2 | 5/2013 |
| WO | 2013098396 | A2 | 7/2013 |
| WO | 2013098397 | A2 | 7/2013 |
| WO | 2013160112 | A2 | 10/2013 |
| WO | 2014047954 | A1 | 4/2014 |
| WO | 2015062983 | A2 | 5/2015 |
| WO | 2015091258 | A1 | 6/2015 |
| WO | 2015166245 | A2 | 11/2015 |
| WO | 2016012774 | A1 | 1/2016 |
| WO | 2016207407 | A1 | 12/2016 |
| WO | 2017194762 | A1 | 11/2017 |
| WO | 2017194763 | A2 | 11/2017 |
| WO | 2017194764 | A1 | 11/2017 |
| WO | 2017194766 | A1 | 11/2017 |
| WO | 2017194769 | A1 | 11/2017 |
| WO | 2018019786 | A1 | 2/2018 |
| WO | D200284-003 | | 8/2020 |

OTHER PUBLICATIONS

Decision of Refusal received for Japanese Patent Application No. 2018-555932, mailed on Oct. 27, 2020, 6 pages (3 pages of English Translation and 3 pages of Official Copy).

Decision to Grant a Patent received for Japanese Patent Application No. 2020-152565, mailed on Apr. 12, 2022, 5 pages.

Decision to Grant mailed Jan. 18, 2017 for Russian Application No. 2016503074, 4 pages.

Decision to Grant received for Russian Patent Application No. 2016503074, mailed on Jan. 18, 2017, 4 pages (Official Copy Only).

English Translation of Office Action for Korean Patent Application No. 10-2017-7037332, mailed on Dec. 25, 2018, 7 pages.

European Search Report received for EP Patent Application No. 21212962.1, mailed on Mar. 17, 2022, 6 pages.

Extended European Search Report received for EP Patent Application No. 21197532.1, mailed on Apr. 11, 2022, 8 pages.

"FlowerMate Vopormax-V Portable Marijuana Vaporizer", Shown at: https://www.youtube.com/watch?v=S3bAYHIf_i4, Aug. 22, 2014,, 1 Page.

"Glo E-cigarette", retrieved from https://ifworlddesignguide.com/entry/235574-glo, 2016, 4 pages.

"Goboof Alfa", retrieved at:https://www.youtube.com/watch?v=I39A90Xp-yl, on Nov. 22, 2014, 1 page.

International Preliminary Report on Patentability for Application No. PCT/EP2016/064756, mailed on Sep. 28, 2017, 9 pages.

International Preliminary Report on Patentability for Application No. PCT/EP2017/061518, mailed on Aug. 17, 2018, 16 pages.

International Preliminary Report on Patentability for Application No. PCT/EP2017/061519, mailed on Jul. 25, 2018, 22 pages.

International Preliminary Report on Patentability for Application No. PCT/EP2017/061526, mailed on Nov. 22, 2018, 10 pages.

International Preliminary Report on Patentability for Application No. PCT/EP2017/068675, mailed on Aug. 27, 2018, 7 pages.

International Preliminary Report on Patentability for International Application No. PCT/EP2017/061520, mailed on Jul. 17, 2018, 11 pages.

International Preliminary Report on Patentability for International Application No. PCT/EP2017/061523, mailed on Jul. 23, 2018, 14 pages.

International Search Report and Written Opinion for Application No. PCT/EP2017/061519, mailed on Dec. 15, 2017, 22 pages.

International Search Report and Written Opinion for Application No. PCT/EP2017/061520, mailed on Sep. 11, 2017, 13 pages.

International Search Report and Written Opinion for Application No. PCT/EP2017/061523, mailed on Sep. 11, 2017, 13 pages.

International Search Report and Written Opinion for Application No. PCT/EP2017/068675, mailed on Nov. 9, 2017, 15 pages.

International Search Report for Application No. PCT/EP2016/064756, mailed on Oct. 5, 2016, 2 pages.

International Search Report for Application No. PCT/EP2017/061518, mailed on Aug. 1, 2017, 4 pages.

International Search Report for Application No. PCT/EP2017/061526, mailed on Aug. 2, 2017, 4 pages.

Invitation to Pay Additional Fees received for PCT Patent Application No. PCT/EP2017/061519, mailed on Sep. 8, 2017, 13 pages.

Notice of Opposition for European Patent Application No. 16738688.7 (EP3313217), mailed on Jun. 28, 2022, 20 pages.

Notice of Reasons for Refusal for Japanese Application No. 2020-152565, mailed on Jun. 29, 2021, 5 pages.

Notice of Reasons for Refusal for Japanese Application No. 2020-152565, mailed on Nov. 24, 2021, 12 pages.

Notice of Reasons for Refusal received for Japanese Patent Application No. 2017-567106, mailed on Nov. 20, 2018, 6 pages.

Notice of Reasons for Rejection for Japanese Application No. 2020-121968, mailed on Jun. 15, 2021, 8 pages.

Office Action and Search Report received for Chinese Patent Application No. 201680037678.4, mailed on Jan. 6, 2020, 10 pages (English Translation Only).

Office Action dated Jul. 13, 2020 for Chinese Application No. 201780026927.4, 15 pages.

Office Action for Brazilian Application No. 112017027824-3, mailed on Jan. 9, 2022, 6 pages.

Office action for Brazilian Application No. 112018073458-6, mailed on Jul. 6, 2022, 7 pages.

Office action for Brazilian Application No. 112018073458-6, mailed on Sep. 28, 2021, 4 pages.

Office Action for Chinese Application No. 2017800293080.0 filed May 12, 2017, mailed on Jul. 22, 2020, 14 pages.

Office Action for Chinese Application No. 201780026927.4, mailed on Dec. 14, 2020, 5 pages.

Office Action for Japanese Application No. 2021-200209, mailed on Mar. 15, 2022, 5 pages.

Office Action for Korean Application No. 10-2019-7027490, mailed on Sep. 1, 2021, 12 pages.

Office Action for Malaysian Application No. PI2018704088, mailed on May 31, 2022, 4 pages.

Office Action for Russian Application No. 201811038, mailed on Aug. 26, 2021, 7 pages.

Office Action mailed Jan. 10, 2020 for Indian Application No. 201847042184, 5 pages.

Office Action mailed Mar. 10, 2020 for Japanese Application No. 2018-555932, 10 pages.

Office Action mailed Aug. 17, 2020 for Chinese Application No. 201780028992.0, 13 pages.

Office Action mailed Feb. 18, 2020 for Japanese Application No. 2018-559712, 6 pages.

Office Action mailed Feb. 25, 2020 for Japanese Application No. 2018-554526, 12 pages.

(56) References Cited

OTHER PUBLICATIONS

Office Action mailed Jan. 28, 2020 for Japanese Application No. 2018-551932, 6 pages (3 pages of English Translation and 3 pages of Official Copy).
Office Action mailed Jun. 28, 2019 for Russian Application No. 2018139838, 5 pages (Official Copy Only).
Office Action mailed Jan. 6, 2020 for Chinese Application No. 201680037678.4, 10 pages.
Office Action mailed dated Feb. 25, 2020 for Japanese Application No. 2018-554501, 12 pages (6 pages of English Translation and 6 pages of Official Copy).
Office Action Received for Canadian Patent Application No. 2,989,260, mailed on Jun. 18, 2021, 3 pages.
Office Action received for Chinese Application No. 201680037678.4, mailed on Apr. 2, 2021, 16 pages.
Office Action received for Korean Application No. 10-2018-7032781, mailed on Jun. 16, 2020, 9 pages.
Office Action received for Korean Application No. 10-2018-7032794, mailed on Jun. 17, 2020, 15 pages.
Office Action received for Russian Patent Application No. 2019504647, mailed on Jun. 4, 2020, 11 pages.
Office Action received for Japanese Application No. 2018-555932, mailed on Oct. 27, 2020, 6 pages.
"QOQ Honor & Smart", by H KL Reviews, Found online at https://www.youtube.com/watch?v=veLv8NX6smE, Mar. 15, 2019, 1 page.
Search Report mailed Dec. 25, 2019 for Chinese Application No. 201680037678.4, 2 pages.
Second Office Action dated May 19, 2021 for Chinese Application No. 2017800293080, 18 pages.
Second office Action received for Chinese Application No. 201680037678.4, mailed on Sep. 28, 2020, 21 pages.
Written Opinion for Application No. PCT/EP2017/061526, mailed on Aug. 2, 2017, 8 pages.
Written Opinion received for Application No. PCT/EP2016/064756, mailed on Oct. 5, 2016, 4 pages.
Li et al., "Handbook of Advanced Robotics", [US] E. L. Safford, Translated by Li, Deming et al., Shanghai Translation Publishing Company, 1st edition, Mar. 1987, pp. 162-163.
Powell et al., "Application and File History for U.S. Appl. No. 29/676,726, filed Jan. 14, 2019".
Powell et al., "U.S. Appl. No. 29/687,461, filed Apr. 12, 2019".
Powell et al., "U.S. Appl. No. 29/687,464, filed Apr. 12, 2019".
Powell et al., "U.S. Appl. No. 29/687,469, filed Apr. 12, 2019".
Powell et al., "U.S. Appl. No. 29/687,471, filed Apr. 12, 2019".
Powell et al., "Design U.S. Appl. No. 29/705,487, filed Sep. 12, 2019".
Uranaka et al., "British American Tobacco to Test Tobacco E-cigarette in Japan", Reuters, Available online <http://www.reuters.com/article/us-brit-am-tobacco-ecigarettes-idUSKBN1330AG>, Nov. 8, 2016, 4 pages.
Powell, et al., "Application and Filing Receipt for U.S. Appl. No. 29/557,914, filed Mar. 14, 2016", 280 pages.
Thorsen, "Application and File History for U.S. Appl. No. 16/099,315, filed Nov. 6, 2018", 222 pages.
Thorsen, et al., "U.S. Appl. No. 15/737,673, filed Dec. 18, 2017", 205 pages.
"E-Livi8 Herbal Vaporizer", Available Online at: https://www.youtube.com/watch?v=S3bAYHIf_i4, Dec. 19, 2014, 4 pages.
Vaporizor Reviews, "Goboof Alfa Portable Vaporizer Review", Available Online at: https://www.youtube.com/watch?v=I39A9OXp-yl, Nov. 22, 2014, 2 pages.
Statement Setting out the Grounds of Appeal received for European Patent Application No. 16738688.7, mailed on Apr. 11, 2024, 12 pages.
Notice of Allowance received for Japanese Patent Application No. 2023-215950, mailed on Jan. 7, 2025, 6 pages (3 pages of English Translation and 3 pages of Official Copy).
Office Action received for Chinese Patent Application No. 202210148348.X, mailed on Jun. 13, 2024, 13 pages (7 pages of English Translation and 6 pages of Official Copy).
Office Action received for Malaysian Patent Application No. PI 2018704088, mailed on Sep. 3, 2024, 4 pages (Official Copy Only).
Notice of Opposition Proceedings received for European Patent Application No. 16738688.7, mailed on Sep. 27, 2023, 17 pages.
Request for Invalidation received for Chinese Patent Application No. 201780029308.0, mailed on Apr. 22, 2024, 284 pages (142 pages of English Translation and 142 pages of Official Copy).
Office Action received for Chinese Patent Application No. 202110774417.3, mailed on Nov. 13, 2023, 11 pages (5 pages of English Translation and 6 pages of Official Copy).

* cited by examiner

APPARATUS FOR HEATING SMOKABLE MATERIAL

RELATED APPLICATIONS

The present application is a Continuation of U.S. application Ser. No. 16/099,323 filed Nov. 6, 2018, which is a National Phase Entry of PCT Application PCT/EP2017/061519 filed May 12, 2017, which claims priority to U.S. Provisional Application No. 62/336,296 filed May 13, 2016, each of which is hereby incorporated by reference in their entirety.

TECHNICAL FIELD

The present invention relates to apparatus arranged to heat smokable material.

BACKGROUND

Articles such as cigarettes, cigars and the like burn tobacco during use to create tobacco smoke. Attempts have been made to provide alternatives to these articles, which burn tobacco, by creating products that release compounds without burning. Examples of such products are so-called heat-not-burn products, also known as tobacco heating products or tobacco beating devices, which release compounds by heating, but not burning, the material. The material may be for example tobacco or other non-tobacco products or a combination, such as a blended mix, which may or may not contain nicotine.

SUMMARY

According to a first aspect of the present invention, there is provided an apparatus arranged to heat smokable material to volatilise at least one component of said smokable material, the apparatus comprising: a housing; the housing having a first opening at a first end through which a consumable article containing smokable material can be removably inserted into the apparatus; at least one heater arrangement arranged within the housing for heating smokable material within the consumable article when in use; a hollow chamber between the first opening and the at least one heater, the hollow chamber surrounding at least a portion of the consumable article when the consumable article is inserted into the device, wherein an inner wall of the chamber and the at least a portion of the consumable article define an air gap there between.

In an exemplary embodiment, the hollow chamber comprises a cooling structure on its outer surface to increase heat flow away from the hollow chamber when the apparatus is in use.

In an exemplary embodiment, the cooling structure comprises at least one cooling fin.

According to a second aspect of the present invention, there is provided an apparatus arranged to heat smokable material to volatilise at least one component of said smokable material, the apparatus comprising: a housing; the housing having a first opening at a first end through which a consumable article containing smokable material can be removably inserted into the apparatus; at least one heater arrangement arranged within the housing for heating smokable material within the consumable article when in use, a hollow chamber between the first opening and the at least one heater, the hollow chamber surrounding at least a portion of the consumable article when the consumable article is inserted into the device, the hollow chamber comprising a gripping section arranged to grip the consumable article when the consumable article is inserted in the apparatus.

BRIEF DESCRIPTION OF THE DRAWINGS

Embodiments of the invention will now be described, by way of example only, with reference to the accompanying drawings, in which.

DETAILED DESCRIPTION

Figure 1:
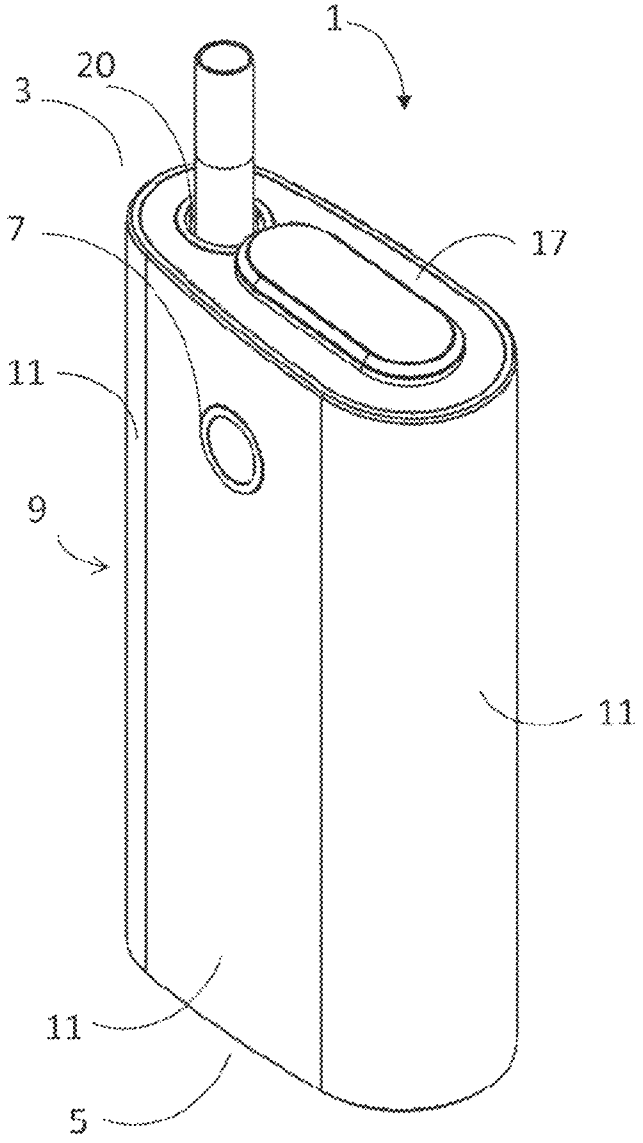
FIG. 1 shows a perspective view of an example of an apparatus for heating a smokable material.

As used herein, the term "smokable material" includes materials that provide volatilised components upon heating, typically in the form of an aerosol. "Smokable material" includes any tobacco-containing material and may, for example, include one or more of tobacco, tobacco derivatives, expanded tobacco, reconstituted tobacco or tobacco substitutes. "Smokable material" also may include other, non-tobacco, products, which, depending on the product, may or may not contain nicotine. "Smokable material" may for example be in the form of a solid, a liquid, a gel or a wax or the like. "Smokable material" may for example also be a combination or a blend of materials.

Apparatus is known that heats smokable material to volatilise at least one component of the smokable material, typically to form an aerosol which can be inhaled, without burning or combusting the smokable material. Such apparatus is sometimes described as a "heat-not-burn" apparatus or a "tobacco beating product" or "tobacco heating device" or similar. Similarly, there are also so-called e-cigarette devices, which typically vaporise a smokable material in the form of a liquid, which may or may not contain nicotine. The smokable material may be in the form of or provided as part of a rod, cartridge or cassette or the like which can be inserted into the apparatus. A heater for heating and volatilising the smokable material may be provided as a "permanent" part of the apparatus or may be provided as part of the smoking article or consumable which is discarded and replaced after use. A "smoking article" in this context is a device or article or other component that includes or contains in use the smokable material, which in use is heated to volatilise the smokable material, and optionally other components.

Referring initially to FIGS. 1 to 4, there is shown an example of an apparatus 1 arranged to heat smokable material to volatilise at least one component of said smokable material, typically to form an aerosol which can be inhaled. The apparatus 1 is a heating apparatus 1 which releases compounds by heating, but not burning, the smokable material.

A first end 3 is sometimes referred to herein as the mouth or proximal end 3 of the device 1 and a second end 5 is sometimes referred to herein as the distal end 5 of the device 1. The apparatus 1 has an on/off button 7 to allow the apparatus 1 as a whole to be switched on and off as desired by a user.

The apparatus 1 comprises a housing 9 for locating and protecting various internal components of the apparatus 1. In the example shown, the housing 9 comprises a uni-body sleeve 11 that encompasses the perimeter of the apparatus 1, capped with a top panel 17 which defines generally the 'top' of the apparatus 1 and a bottom panel 19 which defines generally the 'bottom' of the apparatus 1. In another example the housing comprises a front panel, a rear panel and a pair of opposite side panels in addition to the top panel 17 and the bottom panel 19. The top panel 17 and/or the bottom panel 19 may be removably fixed to the uni-body sleeve 11, to permit easy access to the interior of the apparatus 1, or may be "permanently" fixed to the uni-body sleeve 11, for example to deter a user from accessing the interior of the apparatus 1. In an example, the panels 17 and 19 are made of a plastics material, including for example glass-filled nylon formed by injection moulding, and the uni-body sleeve 11 is made of aluminium, though other materials and other manufacturing processes may be used.

The top panel 17 of the apparatus 1 has an opening 20 at the mouth end 3 of the apparatus 1 through which, in use, a consumable article 21 containing smokable material may be inserted into the apparatus 1 and removed from the apparatus 1 by a user.

The housing 9 has located or fixed therein a heater arrangement 23, control circuitry 25 and a power source 27. In this example, the heater arrangement 23, the control circuitry 25 and the power source 27 are laterally adjacent (that is, adjacent when viewed from an end), with the control circuitry 25 being located generally between the heater arrangement 23 and the power source 27, though other locations are possible.

The control circuitry 25 may include a controller, such as a microprocessor arrangement, configured and arranged to control the heating of the smokable material in the consumable article 21 as discussed further below.

The power source 27 may be for example a battery, which may be a rechargeable battery or a non-rechargeable battery. Examples of suitable batteries include for example a lithium-ion battery, a nickel battery (such as a nickel-cadmium battery), an alkaline battery and/or the like. The battery 27 is electrically coupled to the heater arrangement 23 to supply electrical power when required and under control of the control circuitry 25 to heat the smokable material in the consumable (as discussed, to volatilise the smokable material without causing the smokable material to burn).

An advantage of locating the power source 27 laterally adjacent to the heater arrangement 23 is that a physically large power source 25 may be used without causing the apparatus 1 as a whole to be unduly lengthy. As will be understood, in general a physically large power source 25 has a higher capacity (that is, the total electrical energy that can be supplied, often measured in Amp-hours or the like) and thus the battery life for the apparatus 1 can be longer.

In one example, the heater arrangement 23 is generally in the form of a hollow cylindrical tube, having a hollow interior heating chamber 29 into which the consumable article 21 comprising the smokable material is inserted for heating in use Different arrangements for the heater arrangement 23 are possible. For example, the heater arrangement 23 may comprise a single heating element or may be formed of plural heating elements aligned along the longitudinal axis of the heater arrangement 23. The or each heating element may be annular or tubular, or at least part-annular or part-tubular around its circumference. In an example, the or each heating element may be a thin film heater. In another example, the or each heating element may be made of a ceramics material. Examples of suitable ceramics materials include alumina and aluminium nitride and silicon nitride ceramics, which may be laminated and sintered. Other heating arrangements are possible, including for example inductive heating, infrared heater elements, which heat by emitting infrared radiation, or resistive heating elements formed by for example a resistive electrical winding.

In one particular example, the heater arrangement 23 is supported by a stainless steel support tube and comprises a polyimide heating element. The heater arrangement 23 is dimensioned so that substantially the whole of the smokable material when the consumable article 21 is inserted in the apparatus 1 so that substantially the whole of the smokable material is heated in use.

The or each heating element may be arranged so that selected zones of the smokable material can be independently heated, for example in turn (over time) or together (simultaneously) as desired.

The heater arrangement 23 in this example is surrounded along at least part of its length by a thermal insulator 31. The insulator 31 helps to reduce heat passing from the heater arrangement 23 to the exterior of the apparatus 1. This helps to keep down the power requirements for the beater arrangement 23 as it reduces heat losses generally. The insulator 31 also helps to keep the exterior of the apparatus 1 cool during operation of the heater arrangement 23. In one example, the insulator 31 may be a double-walled sleeve which provides a low pressure region between the two walls of the sleeve. That is, the insulator 31 may be for example a "vacuum" tube, i.e. a tube that has been at least partially evacuated so as to minimise heat transfer by conduction and/or convection. Other arrangements for the insulator 31 are possible, including using heat insulating materials, including for example a suitable foam-type material, in addition to or instead of a double-walled sleeve.

The housing 9 may further comprises various internal support structures 37 (best seen in FIG. 4) for supporting all internal components, as well as the heating arrangement 23.

The apparatus 1 further comprises a collar 33 which extends around and projects from the opening 20 into the interior of the housing 9 and a generally tubular chamber 35 which is located between the collar 33 and one end of the vacuum sleeve 31.

Figure 2:
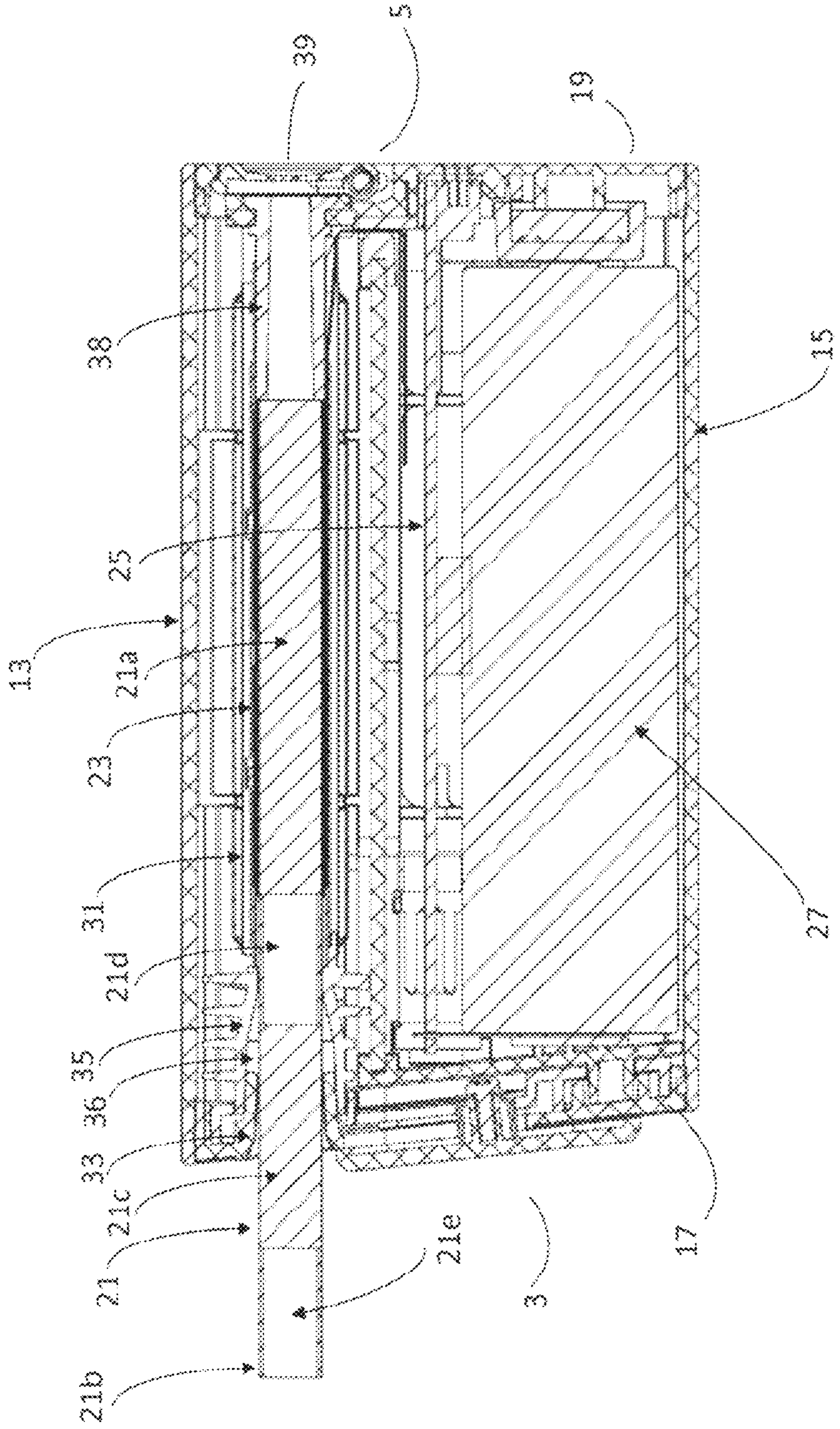
FIG. 2 shows a lateral cross-sectional view of the apparatus of FIG. 1 with a consumable article inserted.
Figure 3:
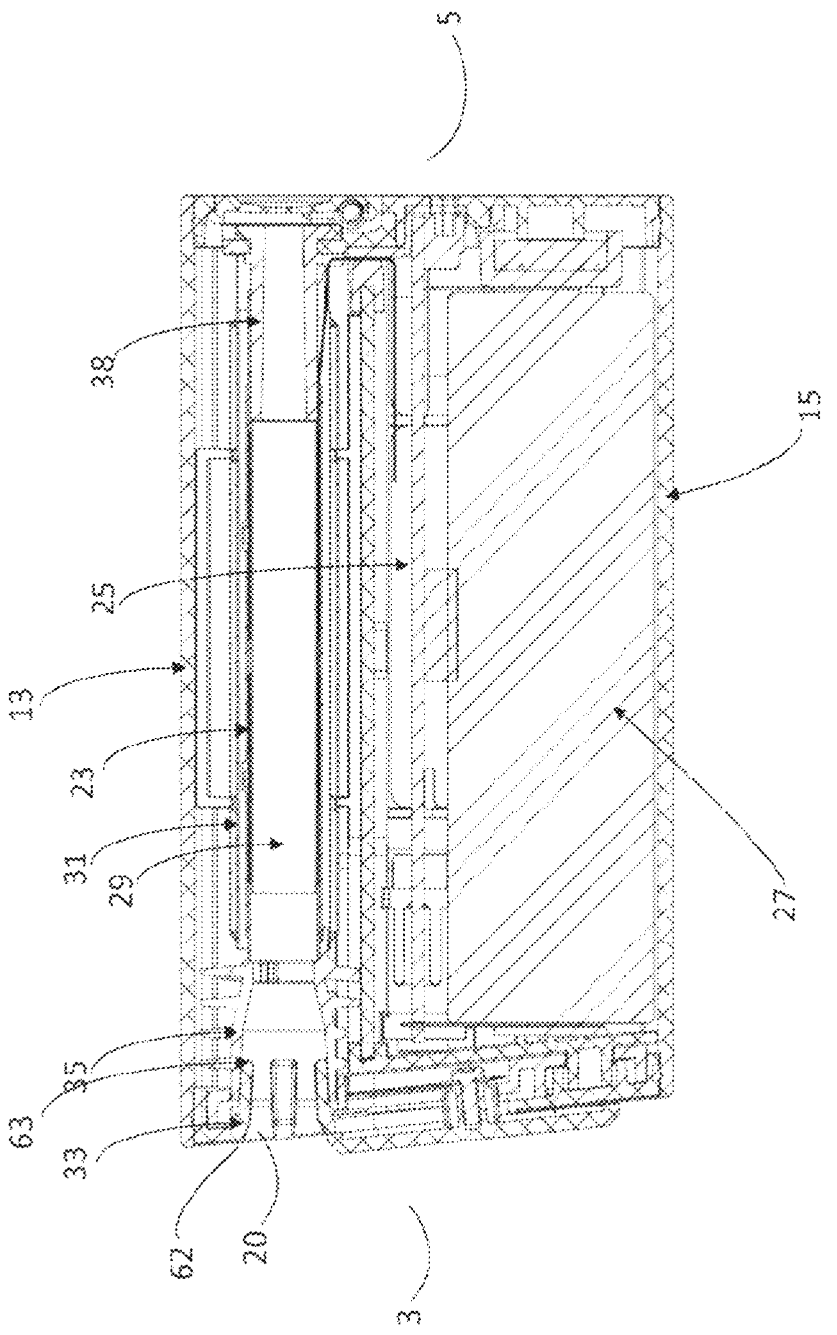
FIG. 3 shows a lateral cross-sectional view of the apparatus of FIG. 1 without a consumable article inserted.
Figure 4:
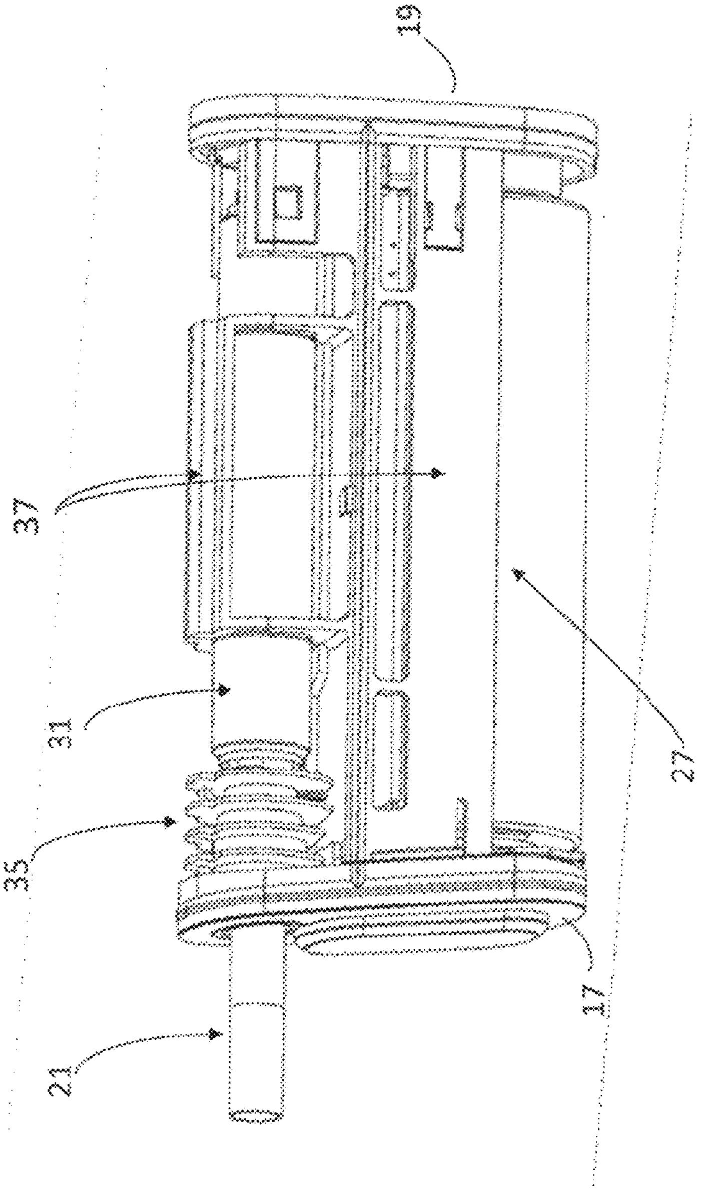
FIG. 4 shows a perspective side view of the apparatus of FIG. 1 with some external panels absent to show interior components of the apparatus.

One end of the chamber 35 connects to and is supported by the collar 33 and the other end of the chamber 35 connects to the one end of the vacuum sleeve 31 and hence supports the vacuum sleeve 31. Accordingly, as best seen in FIG. 3, the collar 33, the chamber 35 and the vacuum tube 31/heater arrangement 23 are arranged co-axially, so that, as best seen in FIG. 2, when the consumable 21 is inserted in the apparatus 1, it extends through the collar 33 and the chamber 35 into the heater chamber 29.

As mentioned above, in this example, the heater arrangement 23 is generally in the form of a hollow cylindrical tube and this tube is in fluid communication with the opening 20 at the mouth end 3 of the device 1 via the chamber 35 and the collar 33.

Referring now to FIGS. 5a to 5d, in this example, the chamber 35 comprises a tubular body 35a that has a first open end 35b and a second open end 35c. The tubular body 35a comprises a first section 35d that extends from the first open end 35b to approximately half away along the tubular body 35a and a second section 35e that extends from approximately half away along the tubular body 35a to the second open end 35c. The first section 35d has a substantially constant internal diameter and the second section 35e has an internal diameter that tapers towards the second open end 35c.

The chamber 35 further comprises a cooling structure 35f, which in this example, comprises a plurality of cooling fins 35i spaced apart along the body 35a, each of which is arranged circumferentially around the body 35a.

The chamber 35 also comprises a flange portion 35g around the second open end 35c and a plurality of projections or clips 35h also arranged around the second open end 35c. Each clip 35h is generally 'L' shaped and comprises a first portion 35h1 that is joined to the flange portion 35g and a second portion 35h2 that is generally perpendicular to first portion 35h1 and which extends in a direction generally parallel to the longitudinal axis of the tubular body 35a. Each second portion 35h2 comprises a stepped surface 35i that faces towards an axis that extends along the longitudinal axis of the tubular body 35a and which stepped surface 35i is slightly curved.

As best seen in FIG. 3, in this example, the chamber 35 is located in the housing 9 between the collar 33 and the vacuum tube 31i heater 23. More specifically, (i) at the second end 35c, the flange 35g butts an end portion of a polyimide tube of the heater arrangement 23 with the clips 35h resiliently engaging with the polyimide tube via their stepped surfaces 35i and the outer surfaces of the clips mating with an inside of the vacuum sleeve 31 (ii) at the first open end 35b, the chamber 35 connects to the collar 33 by means of ridges 60, which form part of the collar 33 and project into the chamber 35. The ridges 60 are angled from a first end 62 of the collar 33 to a second end 63 of the collar towards an axis that extends along the longitudinal axis of the collar 33 and chamber 35. The ridges lie flush with the internal surface of the chamber 35 to form a snug fit.

As is best appreciated from FIG. 2, the inner diameter of the first section 35d of the hollow chamber 35 is larger than the external diameter of the consumable article 2. There is therefore an air gap 36 between the hollow chamber 35 and the consumable article 21 when it is inserted in the apparatus over at least part of the length of the hollow chamber 35. The air gap 36 is around all of the circumference of the consumable article 21 in that region.

Figure 5A:
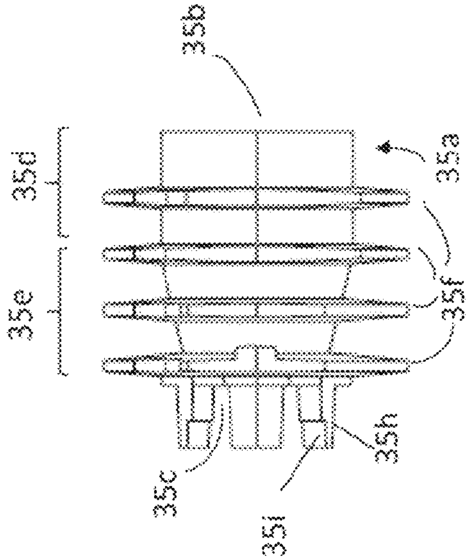
FIG. 5*a* shows a side view of an internal component of the apparatus of FIG. 1.
Figure 5B:
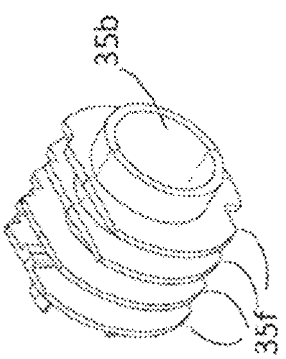
FIG. 5*b* shows a first perspective view of the internal component of the apparatus of FIG. 1.
Figure 5C:
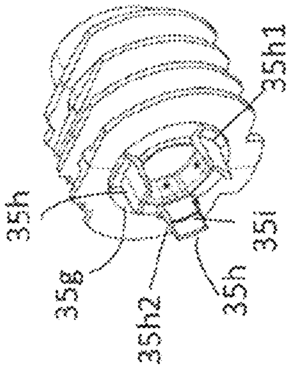
FIG. 5*c* shows a second perspective view of the internal component of the apparatus of FIG. 1.
Figure 5D:
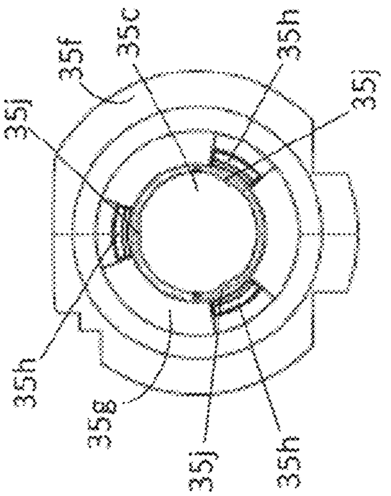
FIG. 5*d* shows an end view of the internal component of the apparatus of FIG. 1.

As best seen in FIG. 5c and FIG. 5d, at the second open end 35c, the chamber 35 comprises a plurality (in this example 3) of small lobes or ridges 35i arranged circumferentially around an inner surface of the chamber 35 at the periphery of second open end 35c. Each of the lobes 35i extends a small distance in a direction parallel to the longitudinal axis of the chamber 35 and also extends a small amount radially at the second open end 35c. Together, the lobes 35i provide a gripping section that grips the consumable article 21 in order to correctly position and retain the portion of the consumable article 21 that is within the chamber 35 when the consumable article 21 is within the apparatus 1. Between them, the lobes 35 gently compress or pinch the consumable article 21 in the region or regions of the consumable article that are contacted by the lobes 35i. The lobes 35j may be comprised of a resilient material (or be resilient is some other way) so that they deform slightly (for example compress) to better grip the consumable article 21 when it is inserted in the apparatus 1 but then regain their original shape when the consumable article 21 is removed from the apparatus 1. The lobes 35i may be formed integrally with the chamber 35 or may be separate components that are attached within the chamber 35. The inner diameter around the lobes, may be, for example, 5.377 mm.

Figure 6:
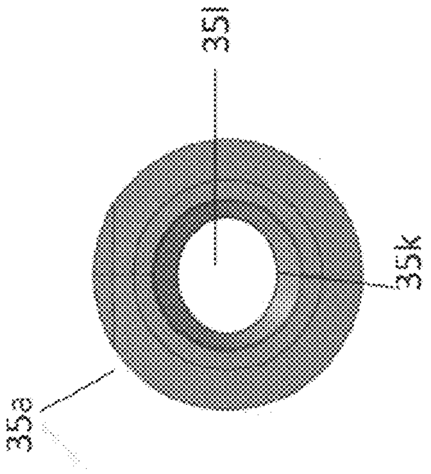
FIG. 6 shows an end view of an alternative internal component of the apparatus of FIG. 1.
Figure 7:
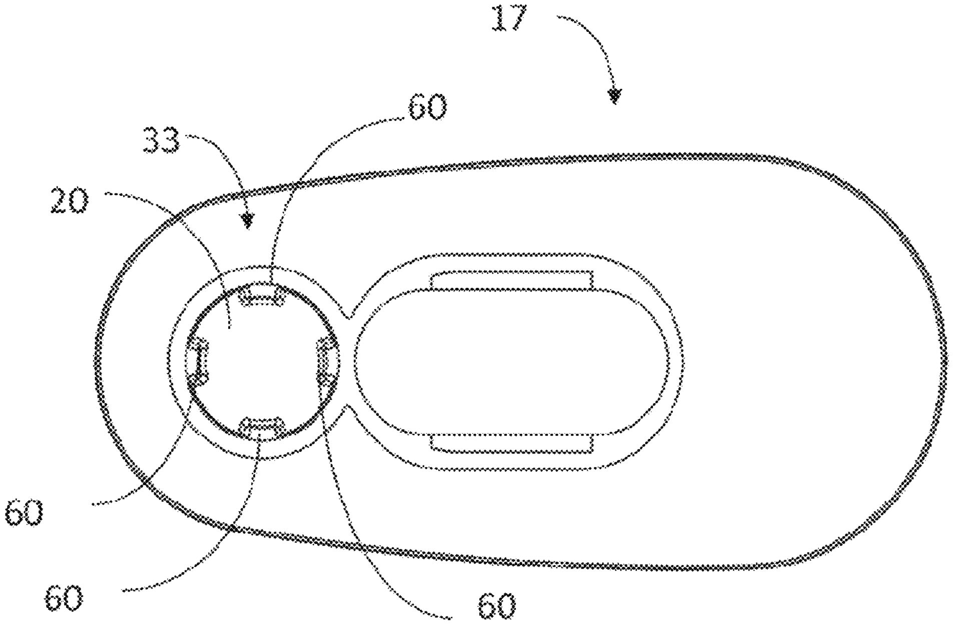
FIG. 7 shows a plan view of a top panel of the apparatus for heating a smokable material.

In an alternative example shown in FIG. 6, a resilient gripping section 35k within the hollow chamber 35 defines a substantially oval aperture 35i which, may extend along the longitudinal axis of the hollow chamber 35, and which when the consumable article 21 is inserted in the apparatus 1, gently compresses or pinches the section of the consumable article 21 that is in the oval aperture 351 so that this section of the consumable article 21 is deformed from being circular to being oval in cross section. In one example, the gripping section 35k is located towards the first open end 35b. In one example, the width of the oval section could be increased or decreased to increase or decrease the insertion/retention force. In a further example, small grooves (not shown) could be added in the surface of the oval aperture 35i that would interfere with the consumable article 21 rather than the entire surface area of the oval aperture 35i. This would minimize insertion/removal sensitivity to the transitions of the various consumable article components (tobacco, tipping paper, paper tube) passing through the gripping section 35k.

In a further example a combination of the lobes 35j and the oval gripping section 35k could be used to retain the consumable article 21 in the hollow chamber 35. For example, an oval gripping section 35k and the arrangement of lobes 35i could be spaced apart longitudinally in the hollow chamber 35 and act separately to retain an inserted consumable article 21 in place, or, the lobes 35i could be arranged around the surface of the oval gripping section 35k.

The chamber 35 may be formed of for example a plastics material, including for example polyether ether ketone (PEEK).

Referring again to FIGS. 2 to 4, in an example, the heating chamber 29 has a region 38 of reduced internal diameter towards the distal end 5. This region 37 provides an end stop for the consumable article 21 passed through the opening at the mouth end 3. This region 38 of reduced internal diameter, may for example, be provided by a hollow tube of the type described in detail in our co-pending application U.S. provisional patent application No. 62/185,227, filed on Jun. 26, 2015, the entire content of which is incorporated herein by reference.

The apparatus 1 may further comprise a door 39 at the distal end 5 that opens and closes an opening in the rear panel to provide access to the heating chamber 29 so that the heating chamber can be cleaned. Examples of suitable doors are also discussed in more detail in our application No. 62/185,227.

Referring now to FIGS. 7 to 10 in particular, there is shown an example of the top panel 17 of the apparatus 1. The top panel 17 generally forms the front end 3 of the housing 9 of the apparatus. The top panel 17 supports the collar 33 which defines an insertion point in the form of the opening 20 through which the consumable article 21 is removably inserted into the apparatus 1 in use.

The collar 33 extends around and projects from the opening 20 into the interior of the housing 9. In one example, the collar 33 is integral with the top panel 17 of the housing so the collar 33 and the top panel 17 form a single piece. In an alternative example, the collar 33 is a distinct element from the top panel 17, but can be attached to the top panel 17 through an attachment, such as a locking mechanism, adhesive, screws. Other attachments that are suitable for attaching the collar 33 to the top panel 17 may be used.

In this example, the collar 33 comprises a plurality of ridges 60 arranged circumferentially around the periphery of the opening 20 and which project into the opening 20. The ridges 60 take up space within the opening 20 such that the open span of the opening 20 at the locations of the ridges 60 is less than the open span of the opening 20 at the locations without the ridges 60. The ridges 60 are configured to engage with a consumable article 21 inserted into the apparatus to assist in securing it within the apparatus 1.

In one example, the ridges 60 are circumferentially equally spaced around the periphery of the opening 20. In one example, there are four ridges 60, in other examples there may be more or fewer than four ridges 60.

Figure 9:
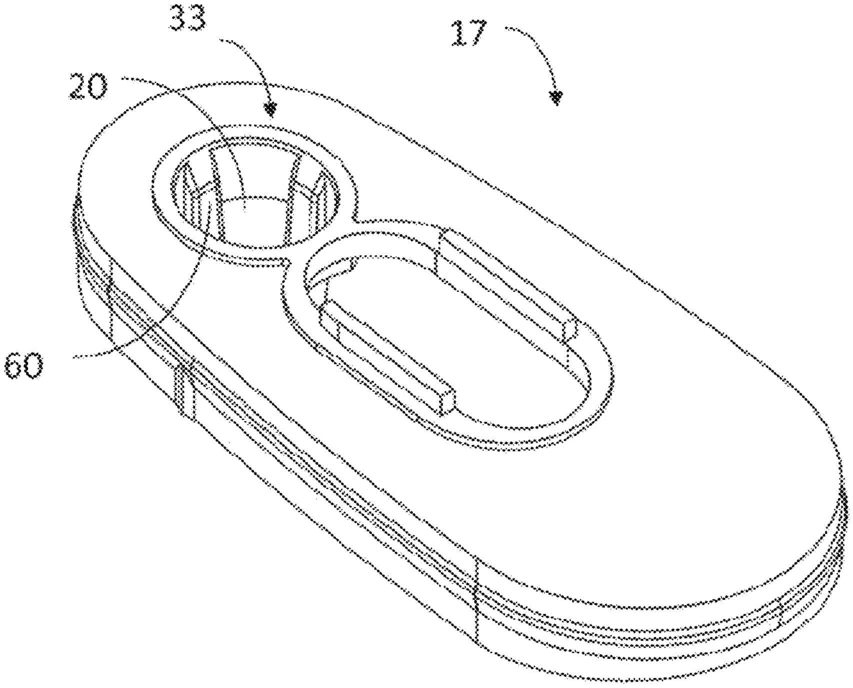
FIG. 9 shows a perspective view of a top panel of the apparatus of FIG. 7.
Figure 10:
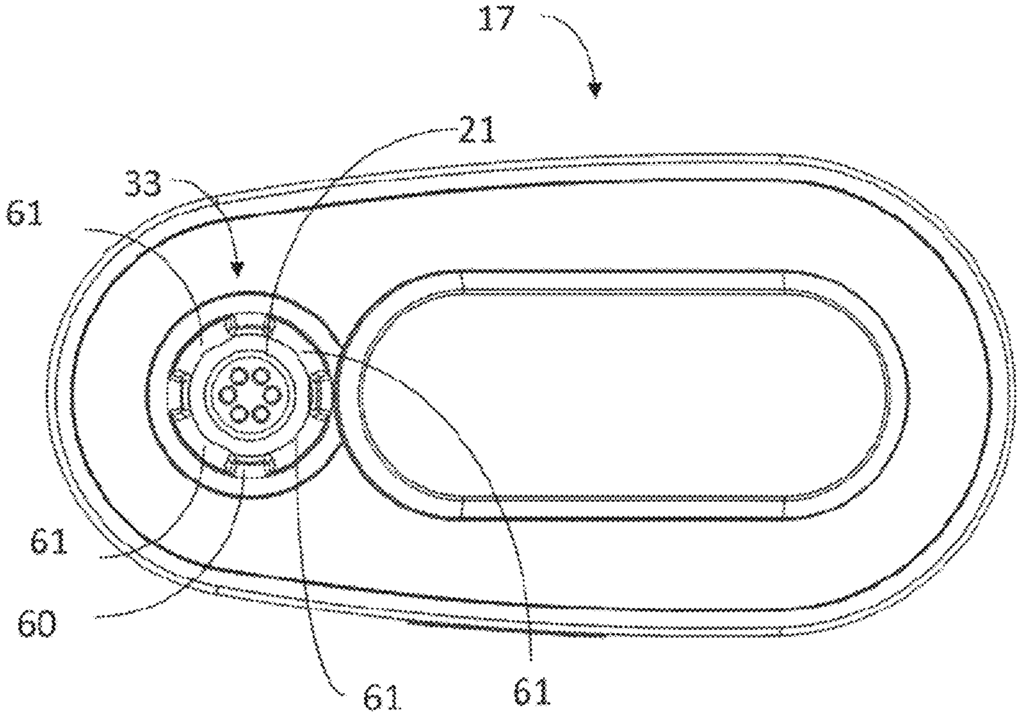
FIG. 10 shows a plan view of a top panel of the apparatus of FIG. 7 with a consumable article inserted.

FIG. 9 shows a plan view of the top panel 17 of the apparatus with a consumable article 21 inserted into the opening 20. The ridges 60 project into the opening 20 to engage with the consumable article 21. The open spaces 61 defined by adjacent pairs of ridges 60 and the consumable article 21 form ventilation paths 61 around the exterior of the consumable article 21. These ventilation paths 61, as will be explained in more detail below, allow hot vapours that have escaped from the consumable article 21 to exit the apparatus 1 and allow cooling air to flow into the apparatus 1 around the consumable 21. The example in FIG. 10 shows four ventilation paths 61 located around the periphery of the consumable article 21, which provide ventilation for the apparatus 1 although there may be more or less such ventilation paths 61.

Figure 8:
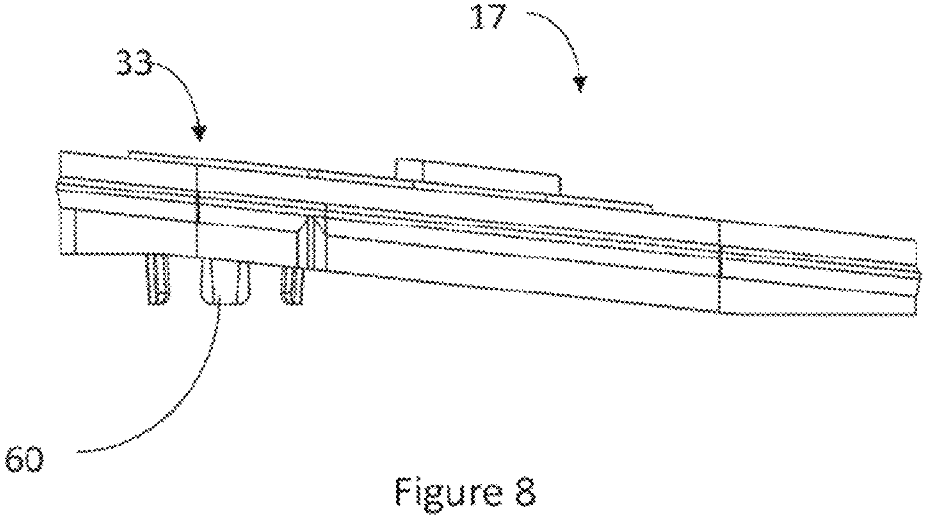
FIG. 8 shows a side view of a top panel of the apparatus of FIG. 7.

As mentioned above, the ridges 60 project radially into the opening 20 but, as best appreciated from FIG. 8, they also extend from the top panel 17 into the housing 9. The projection of the ridges 60 are angled towards each other, such that as the ridges 60 extend into the housing, the distance between the ridges 60 decreases. As best seen in FIG. 3, the projection of the ridges 60 into the housing enables the collar 35 to connect to the chamber 35 by means of the ridges 60 extending through the first open end 35*b* of the chamber 35 and engaging an inner wall of the chamber 35.

Referring again particularly to FIG. 2, in one example, the consumable article 21 is in the form of a cylindrical rod which has or contains smokable material 21*a* at a rear end in a section of the consumable article 21 that is within the heating arrangement 23 when the consumable article 21 is inserted in the apparatus 1. A front end of the consumable article 21 extends from the apparatus 1 and acts as a mouthpiece assembly 21*b* which includes one or more of a filter for filtering aerosol and/or a cooling element 21*c* for cooling aerosol. The filter/cooling element 21*c* is spaced from the smokable material 21*a* by a space 21*d* and is also spaced from the tip of mouthpiece assembly 21*h* by a further space 21*e*. The consumable article 21 is circumferentially wrapped in an outer layer (not shown). In one example, the outer layer of the consumable article 21 is permeable to allow some heated volatilised components from the smokable material to escape the consumable article 21.

In operation, the heater arrangement 23 will heat the consumable article 21 to volatilise at least one component of the smokable material 21*a*.

The primary flow path for the heated volatilised components from the smokable material 21*a* is axially through the consumable article 21, through the space 21*d*, the filter/cooling element 21*c* and the further space 21*e* before entering a user's mouth through the open end of the mouthpiece assembly 21*b*. However, some of the volatilised components may escape from the consumable article 21 through its permeable outer wrapper and into the space 36 surrounding the consumable article 21 in the chamber 35.

It would be undesirable for the volatilised components that flow from the consumable article 21 into the chamber 35 to be inhaled by the user, because these components would not pass through the filter/cooling element 21*c* and thus be unfiltered and not cooled.

Advantageously, the volume of air surrounding the consumable article 21 in the chamber 35 and the fin-cooled interior wall of the chamber 35 causes at least some of the volatilised components that escape the consumable article 21 through its outer layer to cool and condense on the interior wall of the chamber 35 preventing those volatilised components from being possibly inhaled by a user.

This cooling effect may be assisted by cool air that is able to enter from outside the apparatus 1 into the space 36 surrounding the consumable article 21 in the chamber 35 via the ventilation paths 61, which allows fluid to flow into and out of the apparatus. A ventilation path 61 will be defined between a pair of the plurality of neighbouring ridges 60 to provide ventilation around the outside of the consumable article 21 at the insertion point.

In one example, a second ventilation path 61 is provided between a second pair of neighbouring ridges for at least one heated volatilised components to flow from the consumable article 21 at a second location. Therefore ventilation is provided around the outside of the consumable article 21 at the insertion point by the first and second ventilation paths 61.

Furthermore, heated volatilised components that escape the consumable article 21 through its outer wrapper do not condense on the internal wall of the chamber 35 and are able to flow safely out of the apparatus 1 via the ventilation paths 61 without being inhaled by a user.

The chamber 35 and the ventilation both aid in reducing the temperature and the content of water vapour composition released in heated volatilised components from the smokable material.

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the scope of the invention as defined by the claims or limitations on equivalents to the claims, and that other embodiments may be utilised and modifications may be made without departing from the scope of the claimed invention. Various embodiments of the invention may suitably comprise, consist of, or consist essentially of, appropriate combinations of the disclosed elements, components, features, parts, steps, means, etc, other than those specifically described herein. In addition, this disclosure may include other inventions not presently claimed, but which may be claimed in future.

The invention claimed is:

1. An apparatus arranged to heat smokable material to volatilize at least one component of said smokable material, the apparatus comprising:

a housing having an insertion point at one end through which a consumable article comprising smokable material can be removably inserted into the apparatus in use;

at least one heater arrangement within the housing for heating but not burning said smokable material within the consumable article;

a collar extending around and projecting from an opening through which, in use, a consumable article comprising smokable material may be inserted so as to form the insertion point, the collar extending from the opening into an interior of the housing to a generally tubular chamber located between the collar and the at least heater arrangement;

wherein the housing comprises ventilation around an outside of said consumable article at the insertion point to enable at least one heated volatilized component from said smokable material to exit the apparatus and/or air to enter the apparatus, wherein the collar comprises a plurality of first ridges arranged circumferentially around the insertion point that project into the insertion point, wherein a first ventilation path is defined between a first neighboring pair of the plurality of first ridges and wherein the ventilation is provided by the first ventilation path, wherein a second ventilation path is defined between a second neighboring pair of the plurality of first ridges and wherein the ventilation is additionally provided by the second ventilation path, wherein the ventilation is configured to enable the at least one heated volatilized component that has entered a chamber, surrounding said consumable article, to exit the apparatus, wherein the plurality of first ridges protrude into the insertion point to reduce a span of the insertion point at the location of the plurality of first ridges, wherein the plurality of first ridges are configured to engage with said consumable article received within the apparatus in use, wherein the at least one heater arrangement is an inductive heating element, wherein the at least one heater arrangement is in the form of a hollow cylindrical tube, wherein the collar, the chamber and the at least one heater arrangement are arranged co-axially such that, when the consumable is inserted in the apparatus, the consumable extends through the collar and then the chamber and then into the hollow cylindrical tube of the at least one heater arrangement, wherein the chamber comprises a plurality of second ridges arranged circumferentially around an inner surface of the chamber at an end of the chamber opposite to the first ridges, wherein the second ridges provide a gripping section that grips the consumable article in order to correctly position and retain a portion of the consumable article that is within the chamber when the consumable article is within the apparatus.

2. The apparatus according to claim 1, wherein the chamber connects to the collar by means of the first ridges, which form part of the collar and project into the chamber, wherein the first ridges are angled from a first end of the collar to a second end of the collar towards one another and towards an axis that extends along a longitudinal axis of the collar and chamber, such that as the first ridges extend into the housing a distance between the ridges decreases.

3. The apparatus of claim 1, wherein the collar is connectable to the chamber.

4. The apparatus of claim 1, wherein the collar is integral to the housing.

5. The apparatus of claim 1, wherein the collar is distinct from the housing.

6. The apparatus of claim 1, wherein the collar comprises four first ridges.

7. The apparatus of claim 1, wherein the plurality of first ridges extend into the housing and are angled towards one another such that as the first ridges extend into the housing a distance between the ridges decreases.

8. The apparatus of claim 1, wherein the heater arrangement is surrounded along at least part of its length by a thermal insulator.

9. The apparatus of claim 1, wherein the collar is connectable to the chamber and the collar is distinct from the housing, wherein the collar comprises at least four of said first ridges, wherein the plurality of first ridges extend into the housing and are angled towards one another.

10. The apparatus of claim 1, wherein the collar is connectable to the chamber and the collar is distinct from the housing, wherein the collar comprises at least four of said first ridges, wherein the plurality of first ridges extend into the housing and are angled towards one another, wherein the heater arrangement is surrounded along at least part of its length by a thermal insulator.

* * * * *